US012677754B2

(12) United States Patent

Kodama

(10) Patent No.: US 12,677,754 B2

(45) Date of Patent: Jul. 14, 2026

(54) CUTTER ASSEMBLY AND HEDGE TRIMMER

(71) Applicant: YAMABIKO CORPORATION, Tokyo (JP)

(72) Inventor: Hisao Kodama, Tokyo (JP)

(73) Assignee: YAMABIKO CORPORATION (JP)

( * ) Notice: Subject to any disclaimer, the term of this patent is extended or adjusted under 35 U.S.C. 154(b) by 68 days.

(21) Appl. No.: 18/590,326

(22) Filed: Feb. 28, 2024

(65) Prior Publication Data

US 2024/0306554 A1 Sep. 19, 2024

(30) Foreign Application Priority Data

Mar. 13, 2023 (JP) ................................. 2023-038896

(51) Int. Cl.
  *A01G 3/053* (2006.01)
  *A01G 3/04* (2006.01)
(52) U.S. Cl.
  CPC .............. *A01G 3/053* (2013.01); *A01G 3/04* (2013.01); *A01G 2003/0461* (2013.01)
(58) Field of Classification Search
  CPC ........ A01G 3/04; A01G 3/047; A01G 3/0475; A01G 3/053; A01G 2003/0461

(Continued)

(56) References Cited

U.S. PATENT DOCUMENTS 1,165,737 A * 12/1915 Widoe ................... A01G 3/047
                                                              30/211
1,868,402 A * 7/1932 Terry ..................... A01G 3/047
                                                              30/208

(Continued)

FOREIGN PATENT DOCUMENTS

CN         105103977 A  * 12/2015  ............... A01G 3/04
CN         216722206 U  *  6/2022  ............... A01G 3/04

(Continued)

OTHER PUBLICATIONS

Website of Yamabiko Corporation; URL: <https://smp.yamabiko-corp.co.jp/login >, with English translation and brief explanation; date posted on website: Feb. 9, 2023; (total 3 pages).

(Continued)

*Primary Examiner* — Jason Daniel Prone

(74) *Attorney, Agent, or Firm* — Harness, Dickey & Pierce, P.L.C.

(57) ABSTRACT

A cutter assembly for a hedge trimmer includes lower and upper cutters in a longitudinal structure having a longitudinal axis and overlapping each other along a first direction perpendicular to the longitudinal axis. The lower and upper cutters slide relative to each other along a second direction parallel to the longitudinal axis. Each of the lower and upper cutters has a cutter main body and a plurality of cutting edges protruding from the cutter main body along a third direction perpendicular to the longitudinal axis. The cutter main body of the lower cutter has an inner circumferential face enclosing an elongated hole. The elongated hole penetrates the cutter main body. The inner circumferential face is configured with first to fourth sides. The first side of the inner circumferential face has a protrusion protruding toward the second side of the inner circumferential face.

11 Claims, 8 Drawing Sheets

(58) Field of Classification Search
USPC .......................................... 30/208, 216, 223
See application file for complete search history.

(56) References Cited

U.S. PATENT DOCUMENTS

| | | | | |
|---|---|---|---|---|
| 2,787,111 A * | 4/1957 | Templeton | .......... | A01D 34/135 |
| | | | | 56/297 |
| 3,364,574 A * | 1/1968 | Stelljes et al. | ......... | A01G 3/053 |
| | | | | 30/166.3 |
| 3,798,768 A * | 3/1974 | Cowley | .................. | A01G 3/053 |
| | | | | 30/223 |
| 4,520,618 A * | 6/1985 | Sorensen | ............... | A01D 34/18 |
| | | | | 56/298 |
| 5,075,972 A * | 12/1991 | Huang | ................... | A01G 3/053 |
| | | | | 30/216 |
| 5,138,908 A * | 8/1992 | Raetz | ..................... | A01G 3/053 |
| | | | | 76/104.1 |
| 5,153,996 A * | 10/1992 | Kuzarov | ................ | A01G 3/053 |
| | | | | 30/216 |
| 5,412,873 A * | 5/1995 | Gibson | .................. | A01G 3/053 |
| | | | | 30/216 |
| 5,426,856 A * | 6/1995 | Aiyama | ................. | A01G 3/053 |
| | | | | 30/208 |
| 5,640,837 A * | 6/1997 | Ueyama | ................. | A01G 3/053 |
| | | | | 56/298 |
| 5,653,030 A * | 8/1997 | Yokoyama | ............. | A01G 3/053 |
| | | | | 30/216 |
| 5,771,583 A * | 6/1998 | Kremsler | ............... | A01G 3/053 |
| | | | | 30/216 |
| 5,987,753 A * | 11/1999 | Nagashima | ............ | A01G 3/053 |
| | | | | 30/223 |
| 6,170,159 B1 * | 1/2001 | Kramer | .................. | A01G 3/053 |
| | | | | 30/216 |
| 6,263,579 B1 * | 7/2001 | Nagashima | ............ | A01G 3/053 |
| | | | | 30/223 |
| 6,415,515 B1 * | 7/2002 | Wheeler | ................ | A01G 3/053 |
| | | | | 30/208 |
| 6,910,276 B2 * | 6/2005 | Huang | ................... | A01G 3/053 |
| | | | | 30/223 |
| 6,959,495 B2 * | 11/2005 | Rudolph | ................ | A01G 3/053 |
| | | | | 30/223 |
| 7,406,770 B2 * | 8/2008 | Mace | ..................... | A01G 3/053 |
| | | | | 30/223 |
| 8,028,423 B2 * | 10/2011 | Matsuo | .................. | A01G 3/053 |
| | | | | 30/216 |
| 8,826,546 B2 * | 9/2014 | Svennung | ............. | A01G 3/053 |
| | | | | 30/216 |
| 9,723,794 B2 * | 8/2017 | Soltesz | .................. | A01G 3/053 |
| 9,877,435 B2 * | 1/2018 | Li | ........................ | A01G 3/053 |
| 10,321,636 B2 * | 6/2019 | Peterson | ............... | A01G 3/053 |
| 10,631,468 B2 * | 4/2020 | Hansson | ............... | A01G 3/053 |
| 11,419,276 B2 * | 8/2022 | Kitahara | ............... | A01G 3/053 |
| 11,622,507 B2 * | 4/2023 | Li | ......................... | A01G 3/053 |
| | | | | 30/223 |
| 11,839,185 B2 * | 12/2023 | Hanada | .................. | A01G 3/053 |
| 11,844,317 B2 * | 12/2023 | Suzuki | .................. | A01G 3/053 |
| 11,963,489 B2 * | 4/2024 | Kitahara | ............... | A01G 3/053 |
| 12,193,371 B2 * | 1/2025 | Suzuki | .................. | A01G 3/053 |
| D1,074,346 S * | 5/2025 | Kodama | ........................... | D8/8 |
| D1,079,414 S * | 6/2025 | Kodama | ........................... | D8/8 |
| 2012/0017447 A1* | 1/2012 | Nie | ........................ | A01G 3/053 |
| | | | | 30/228 |
| 2012/0017558 A1* | 1/2012 | Pellenc | .................. | A01G 3/053 |
| | | | | 56/233 |
| 2013/0031785 A1* | 2/2013 | Kaupp | ................... | A01G 3/053 |
| | | | | 30/223 |
| 2013/0326885 A1* | 12/2013 | Kaupp | ................... | A01G 3/053 |
| | | | | 30/208 |
| 2018/0206410 A1* | 7/2018 | Liu | ........................ | A01G 3/053 |
| 2019/0338839 A1* | 11/2019 | Hanada | .................. | A01G 3/053 |
| 2020/0045889 A1* | 2/2020 | Shimizu | ............... | A01G 3/053 |
| 2022/0087110 A1* | 3/2022 | Kodama | ............... | A01G 3/053 |
| 2024/0306555 A1* | 9/2024 | Kodama | ............... | A01G 3/053 |
| 2025/0234813 A1* | 7/2025 | Manulik | ............... | A01G 3/053 |

FOREIGN PATENT DOCUMENTS

| | | | | | |
|---|---|---|---|---|---|
| JP | 2005006534 A | * | 1/2005 | ............. | A01G 3/04 |
| JP | 2006020550 A | * | 1/2006 | ............. | A01G 3/04 |
| JP | 2022-154562 A | | 10/2022 | | |
| JP | 2023077677 A | * | 6/2023 | ............. | A01G 3/04 |

OTHER PUBLICATIONS

Website of Yamabiko Corporation; URL: <https://smp.yamabiko-corp.co.jp/ui2/member/asset-detail/62516 >, with English translation and brief explanation; date posted on website: Feb. 9, 2023; (total 3 pages).

Digital pamphlet of Yamabiko Corporation published on Feb. 9, 2023.(total 2 pages).

Certificate for Application of Exception to Lack of Novelty of Invention for Yamabiko Corporation; dated Mar. 28, 2023 (total 4 pages).

* cited by examiner

CUTTER ASSEMBLY AND HEDGE TRIMMER

CROSS REFERENCE TO RELATED APPLICATIONS

The present application claims priority under 35 U.S.C. § 119 to Japanese Patent Application, Application No. 2023-038896, filed on Mar. 13, 2023. The contents of this application are incorporated herein by reference in their entirety.

BACKGROUND

Technical Field

The present invention relates to a cutter assembly and a hedge trimmer.

Related Art

A hedge trimmer is used as a gardening tool for pruning hedges and trees (see Japanese Patent Application, Publication No. 2022-154562). This gardening trimmer includes an upper blade and a lower blade (hereinafter also simply referred to as "blade") that reciprocally move back and forth.

Generally, as for hedge trimmers, elongated holes (lightning holes) are formed on blades for the purpose of weight reduction.

However, during pruning of hedges and trees, especially in finishing work, a tip of a branch sometimes enters the elongated hole. From this state, when the hedge trimmer swings left and right, the tip of the branch having stayed in the elongated hole of the blade gets caught on a circumferential edge of the elongated hole, causing resistance to the swing operation and reducing workability.

In view of the above circumstances, the present invention provides a cutter assembly and a hedge trimmer having the same, the cutter assembly providing improved workability by quickly removing a branch having entered an elongated hole during pruning work on hedges or trees.

According to an aspect of the present invention, a cutter assembly for a hedge trimmer is provided. The cutter assembly comprises a lower cutter and an upper cutter overlap each other and slidable along their longitudinal direction. Each of the lower cutter and the upper cutter has a cutter main body and a plurality of cutting edges protruding laterally from the cutter main body. At least the cutter main body of the lower cutter has an elongated hole penetrating the cutter main body of the lower cutter in its thickness direction and extending along the longitudinal direction. The elongated hole is exposed to an outside of the cutter assembly. An area along the longitudinal direction on an inner circumferential face of the elongated hole has at least one removal structure having a function of contacting a branch that has entered the elongated hole, and thereby removing the branch from within the elongated hole.

According to such an aspect, the branch having entered the elongated hole is quickly removed so that an operator does not feel caught and can smoothly perform pruning work on hedges and trees.

DETAILED DESCRIPTION

Hereinafter, a description will be given of embodiments of the present invention with reference to the drawings. Various features described in the following embodiments can be combined with each other.

First Embodiment

First, a description will be given of a cutter assembly and a hedge trimmer according to the first embodiment of the present invention.

Figure 1:
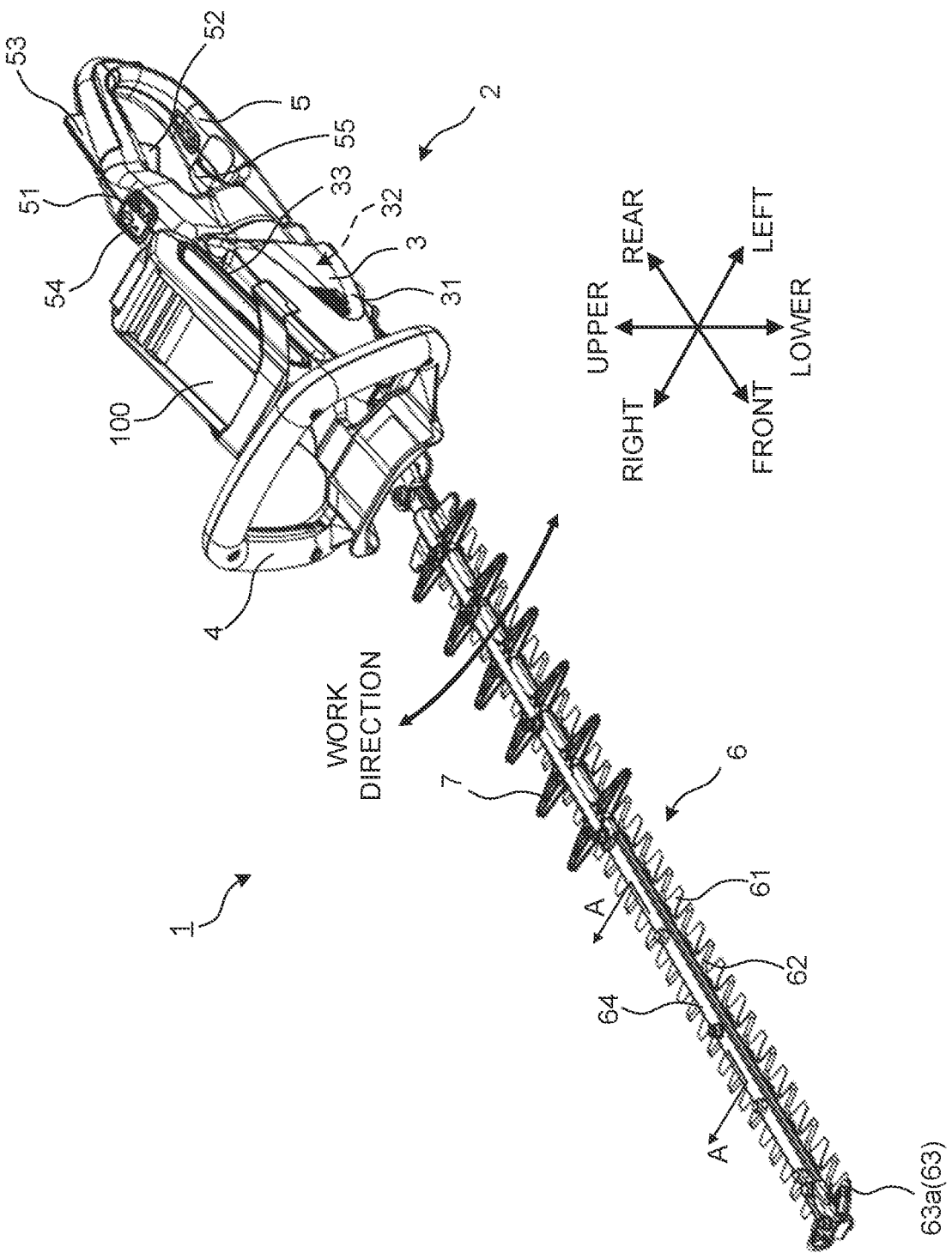
FIG. 1 is an overall upper perspective view of a hedge trimmer according to the first embodiment.
Figure 2:
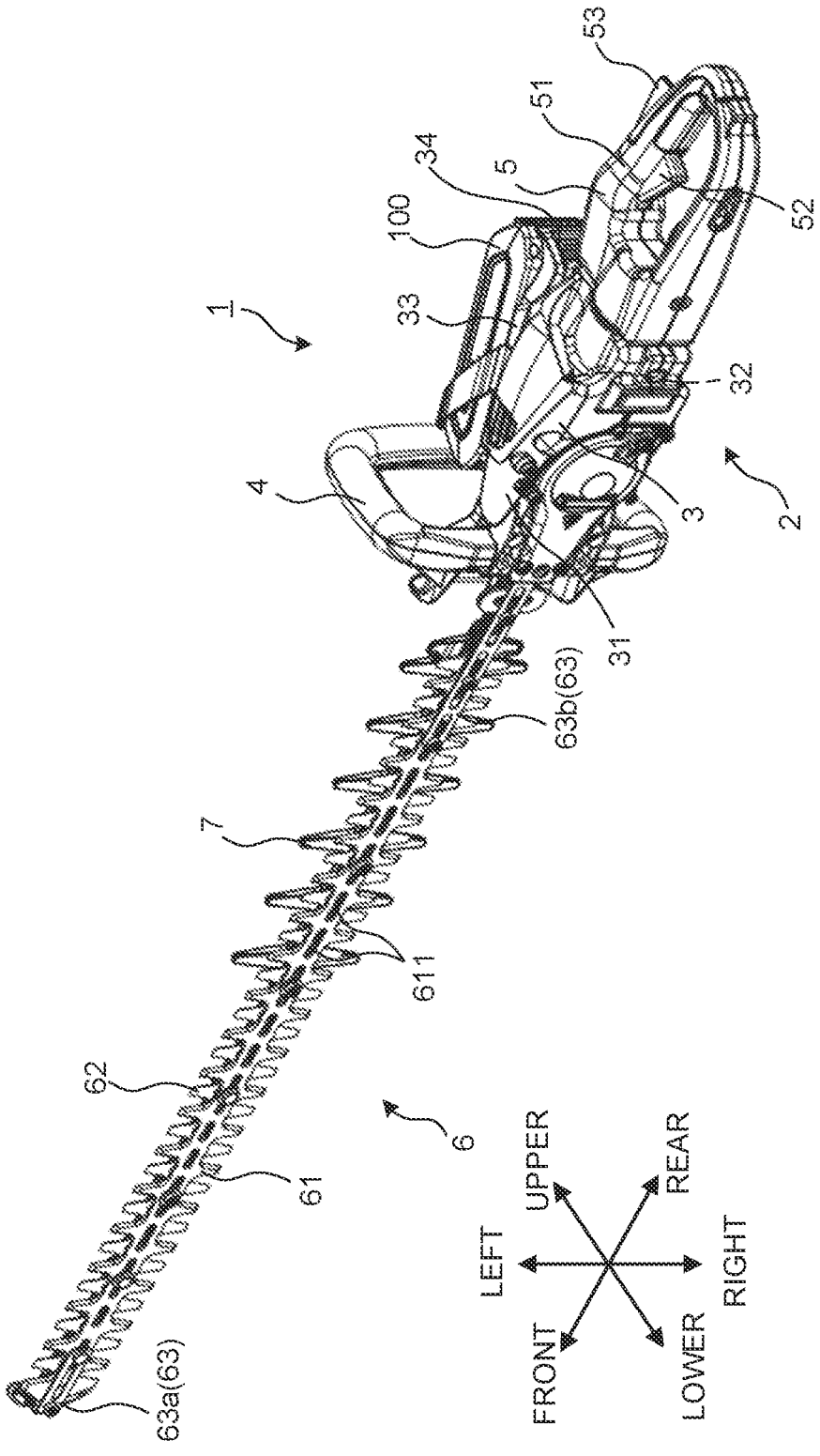
FIG. 2 is an overall lower perspective view of the hedge trimmer according to the first embodiment.
Figure 3:
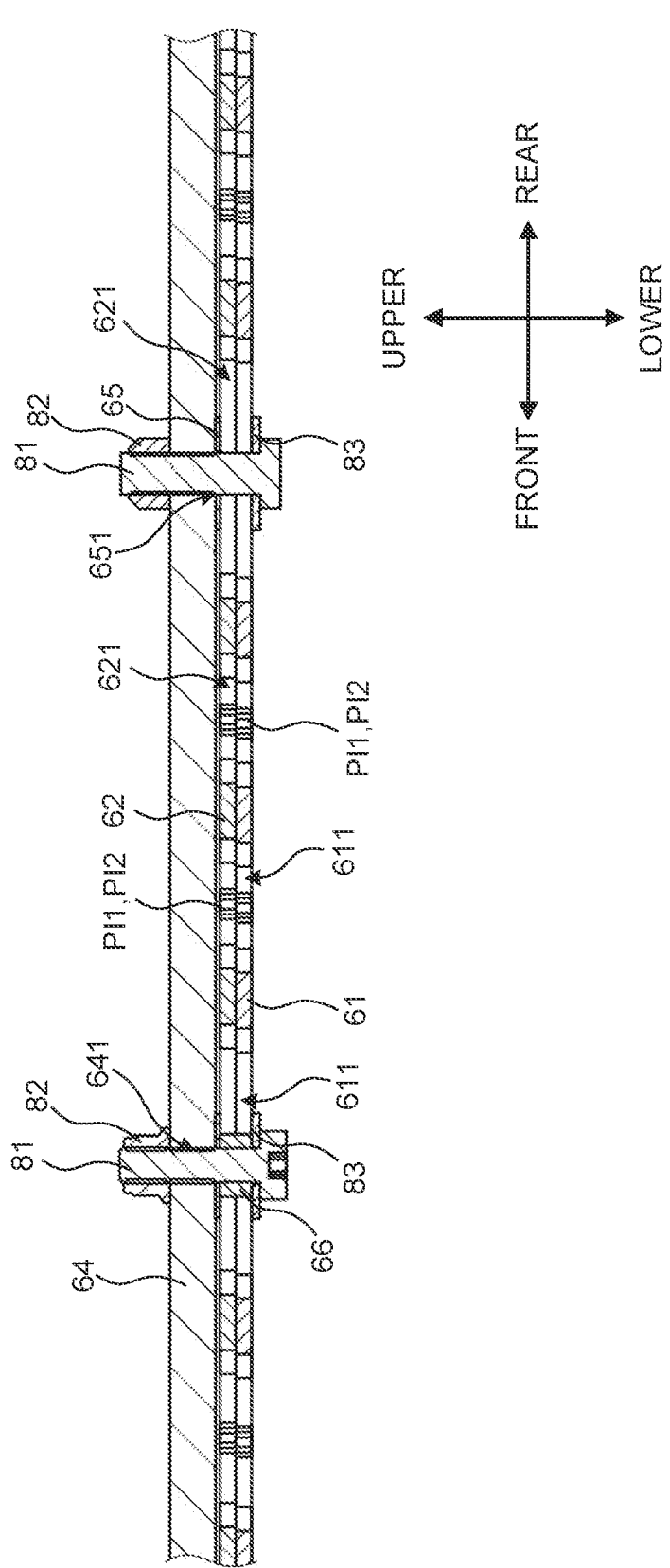
FIG. 3 is an enlarged sectional view at line A-A in FIG. 1.

FIG. 1 is an overall upper perspective view of a hedge trimmer according to the first embodiment. FIG. 2 is an overall lower perspective view of the hedge trimmer according to the first embodiment. FIG. 3 is an enlarged sectional view at line A-A in FIG. 1.

Directions of the hedge trimmer and respective components of the hedge trimmer are defined based on "upper and lower", "left and right", and "front and rear" represented in the drawings.

The hedge trimmer 1 illustrated in FIG. 1 is a small hand-held cutting working machine used for trimming and pruning of hedges and trees, and is configured to be electrically driven with a battery 100 attached.

The hedge trimmer 1 includes a drive operation unit 2 and a cutter assembly 6 connected to the front side of the drive operation unit 2.

The drive operation unit 2 includes a main body 3, a front handle 4 disposed on the front side of the main body 3, and a rear handle 5 disposed on the rear side of the main body 3. With hands gripping the front handle 4 and the rear handle 5, the hedge trimmer 1 can be operated.

The main body 3 has a main body case 31 and an electric motor 32 accommodated in the main body case 31.

The main body case 31 is a housing made of resin and has a top face sloping with respect to a bottom face. The top face of the main body case 31 slopes down from the rear side to the front side. In other words, the front part of the main body case 31 is lower than the rear part. The main body case 31 is formed in a substantially triangular shape as viewed from the lateral side.

The electric motor (power source) 32 is connected to the cutter assembly 6 via a drive transmission mechanism (not illustrated), and thereby the cutter assembly 6 is driven. As described below, the cutter assembly 6 has the lower cutter 61 and the upper cutter 62, and the electric motor 32 allows them to slide relatively to each other along the longitudinal direction.

The top face of the main body case 31 has a battery mount 33 for the battery 100 to be attached thereto. The battery mount 33 slopes down from the rear side to the front side in line with the top face of the main body case 31.

The battery 100 is a common battery providing a predetermined output by accommodating two or more lithium-ion battery cells in a rectangular case extending in the front-back direction.

Although not illustrated in the drawings, an engagement portion for engaging with the battery mount 33 protrudes from the rear end part of a bottom face of the battery 100.

When the battery 100 is to be attached to the battery mount 33, the battery 100 slides from the rear side to the front side relatively to the battery mount 33 so that the lower part of the battery 100 fits into the battery mount 33. When the front end of the battery 100 reaches such a position that the front end of the battery 100 is supported by the front end of the battery mount 33, the engagement portion of the battery 100 engages with the battery mount 33 and thereby the battery 100 is fixed to the battery mount 33.

The battery 100 attached to the battery mount 33 slopes down from the rear side to the front side, and thereby the front part of the battery 100 is disposed lower than the rear part.

A top face of the battery mount 33 has a metal connection terminal (not illustrated). The connection terminal is electrically connected to a control board (not illustrated) or the electric motor 32. When the connection terminal of the battery 100 is electrically connected to a connection terminal of the battery mount 33, power is supplied from the battery 100 to the control board or the electric motor 32.

When the battery 100 is to be removed from the battery mount 33, an operation on a connection lever 34 (see FIG. 2) on the rear end of the battery 100 releases the engagement state of the battery mount 33 and the engagement portion, and thereby allows the battery 100 to slide backward relatively to the battery mount 33.

A front handle 4 is disposed on the front side of the main body case 31, as illustrated in FIG. 1. The front handle 4 is disposed on the front side of the battery 100 attached to the battery mount 33.

The front handle 4 has a horizontal portion extending in the left-right direction and vertical portions extending downward from the left and right ends of the horizontal portion, and those portions are formed as a whole. The lower ends of the two vertical portions are fixed to the front end of the main body case 31.

A rear handle 5 is provided at the rear side of the main body case 31. The rear handle 5 is connected to the rear part of the main body case 31 rotatably about, as a rotation axis, an axis along the front-back direction.

The rear handle 5 has a grip 51 having an opening penetrating the rear handle 5 in the left-right direction. When an operator holds the hedge trimmer 1, he/she grips the rear handle 5 while inserting his/her hand into the opening of the grip 51.

As illustrated in FIG. 1, the inner circumference of the grip 51 of the rear handle 5 has a throttle lever 52 as an operation unit for driving the cutter assembly 6 when grasped by the operator.

The upper side of the grip 51 has a lock release lever 53 for preventing movement (operation) of the throttle lever 52 and releasing the prevention and has a power switch 54.

Furthermore, the lower side of the grip 51 has a rotation lock lever 55 for, when the cutter assembly 6 is not driven, preventing a rotation of the rear handle 5 relative to the main body 3 and releasing the prevention.

The cutter assembly 6 is connected to the front side of the main body 3, and the rear part of the cutter assembly 6 is protected by a cover 7.

Figure 4:
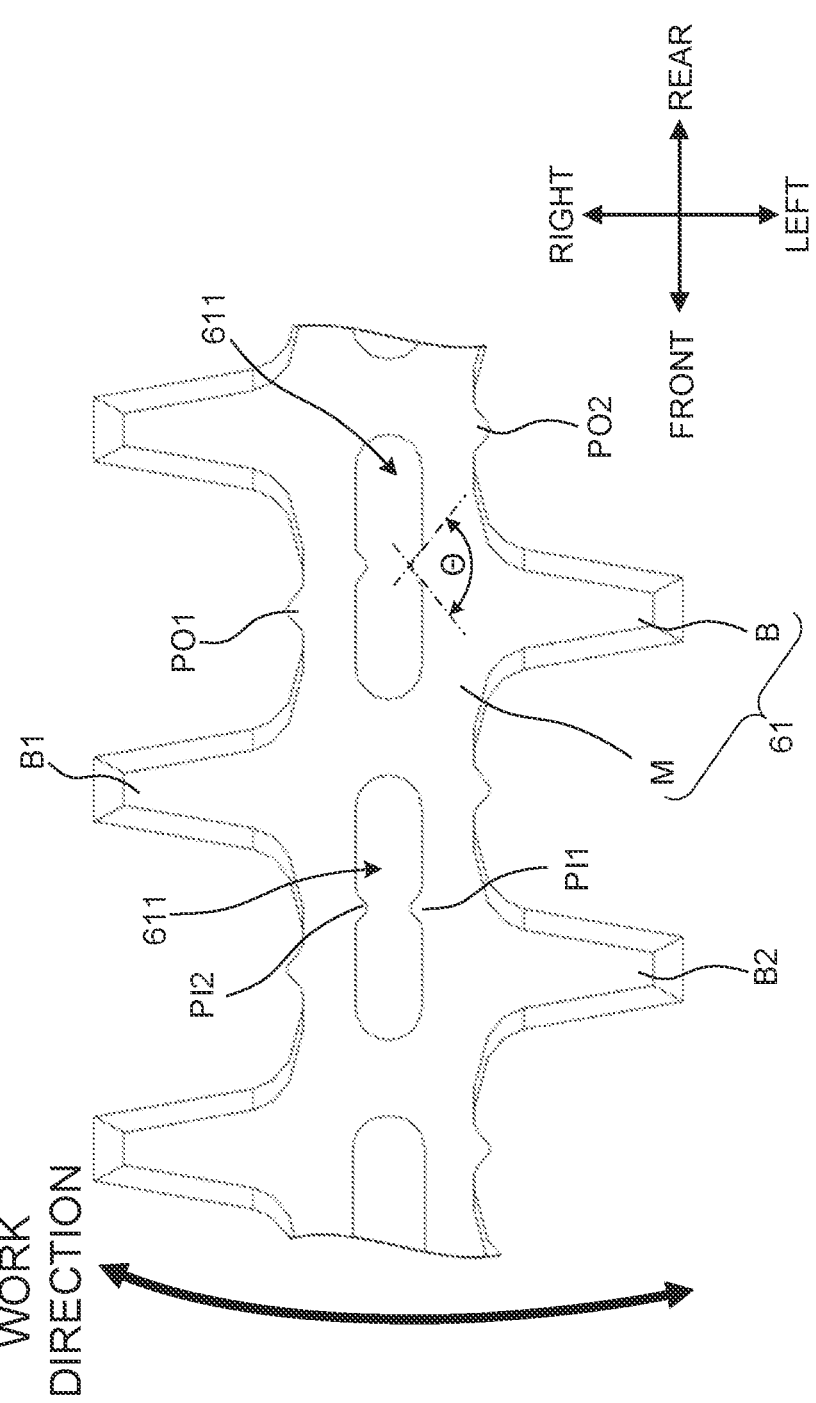
FIG. 4 is a diagram illustrating configurations of a first protrusion and a second protrusion.
Figure 5:
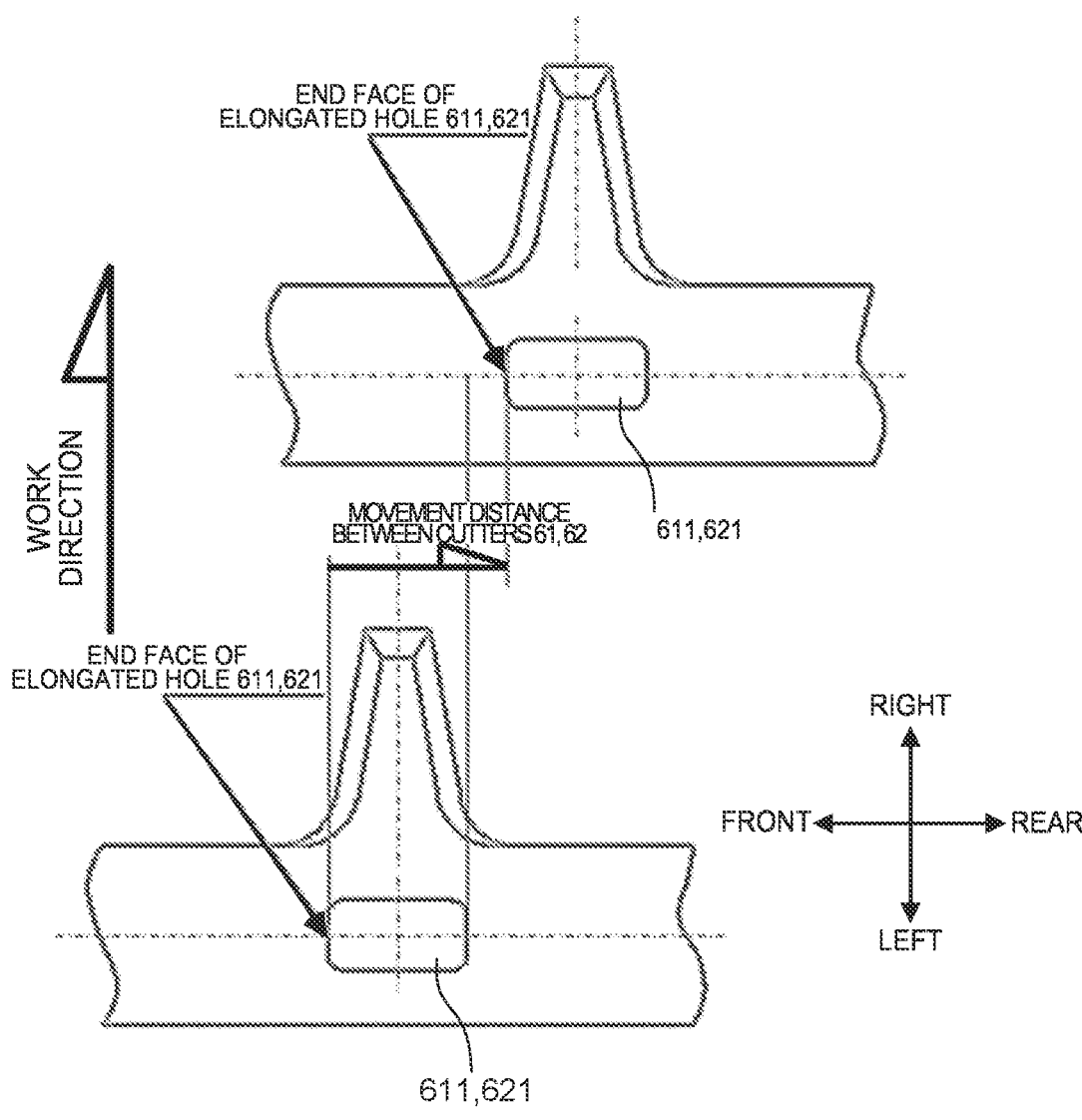
FIG. 5 is a diagram illustrating a relationship between a cutter movement distance and a length of the elongated hole.
Figure 6:
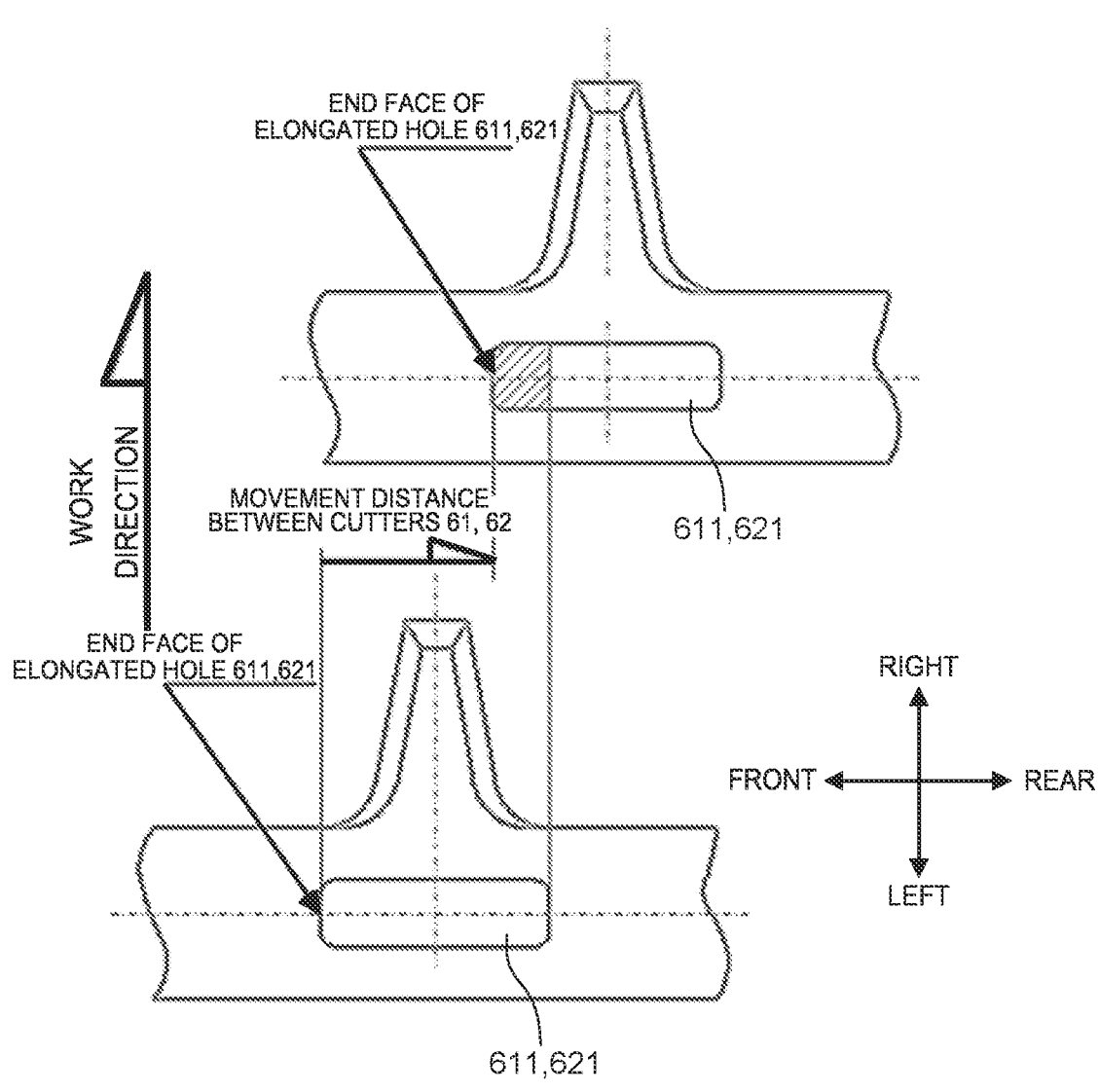
FIG. 6 is a diagram illustrating a relationship between the cutter movement distance and the length of the elongated hole.
Figure 7:
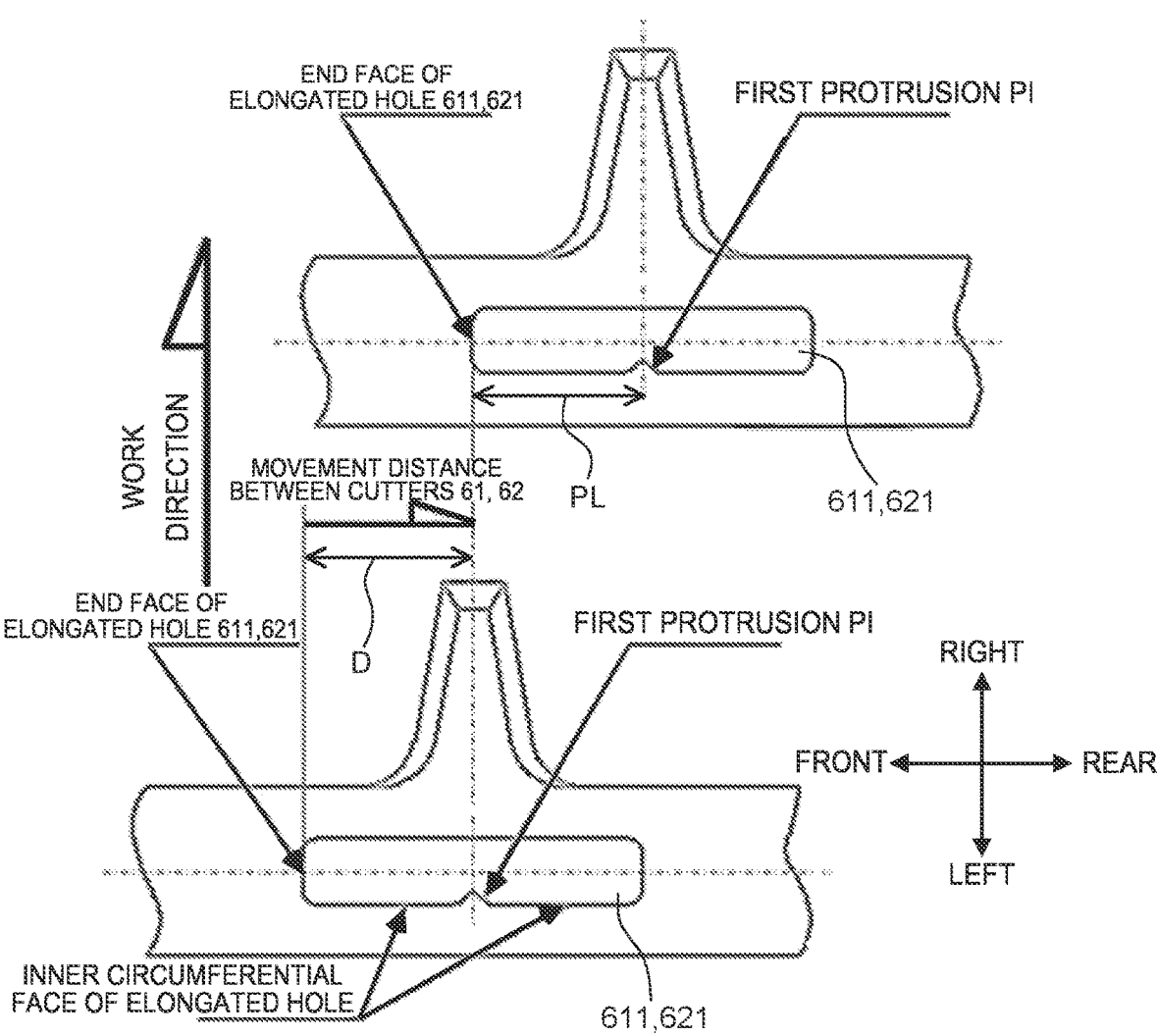
FIG. 7 is a diagram illustrating the relationship between the cutter movement distance and the length of the elongated hole.

FIG. 4 is a diagram illustrating configurations of a first protrusion and a second protrusion. Each of FIG. 5 to FIG. 7 is a diagram illustrating a relationship between a cutter movement distance and a length of the elongated hole.

The cutter assembly (cutter assembly for hedge trimmers) 6 includes a lower cutter 61, an upper cutter 62, a lower cutter support 63, and an upper cutter support 64. The lower cutter 61 and the upper cutter 62 overlap each other and are slidable relatively to each other along the longitudinal direction (front-rear direction).

The configuration of the lower cutter 61 and the configuration of the upper cutter 62 are substantially the same, and therefore FIG. 4 illustrates the configuration of the lower cutter 61 viewed from the lower side.

The lower cutter support 63 is disposed on the lower side of the lower cutter 61. For weight reduction, the lower cutter support 63 is divided into two parts of a front support 63a and a rear support 63b, as illustrated in FIG. 2. In other words, the cutter assembly 6 includes the lower cutter support 63 covering part of the lower cutter 61 and disposed on a side of the lower cutter 61, the side being opposite to the upper cutter 62.

On the other hand, the upper cutter support 64 is disposed on the upper side of the upper cutter 62. The upper cutter support 64 extends along the longitudinal direction (front-back direction) of the cutter assembly 6.

As illustrated in FIG. 3, the cutter assembly 6 has a slide sheet plate 65 between the upper cutter support 64 and the upper cutter 62.

Each of the lower cutter 61 and the upper cutter 62 has a cutter main body M and a plurality of cutting edges B protruding laterally from the cutter main body M. The cutter assembly 6 according to the present embodiment has a double-edged configuration with the plurality of cutting edges B of each of the lower cutter 61 and the upper cutter 62 protrude to both sides of the cutter main body M.

The cutter main body M of the lower cutter 61 has elongated holes 611 penetrating the cutter main body M of the lower cutter 61 in its thickness direction and extending along the longitudinal direction. The cutter main body M of the upper cutter 62 also has elongated holes 621 penetrating the cutter main body M of the upper cutter 62 in its thickness direction and extending along the longitudinal direction of the cutter main body M of the upper cutter 62. In other words, in the double-edged cutter assembly 6, the elongated holes are formed on the cutter main body M of each of the lower cutter 61 and the upper cutter 62. An elongated hole may not be formed on the cutter main body M of the upper cutter 62, as long as it is formed at least on the cutter main body M of the lower cutter 61.

As illustrated in FIG. 3, through holes 641 are formed on the upper cutter support 64 and through holes 651 are formed on the slide sheet plate 65. At predetermined positions, bolts 81 are each inserted through a washer 83, the elongated hole 611, the elongated hole 621, the through hole 651, and the through hole 641, and the end of the bolts 81 are each screwed into a nut 82. Thereby, the cutter assembly 6 is assembled.

The bolts 81 at the predetermined positions are each further inserted into a spacer 66 disposed between the washer 83 and the slide sheet plate 65. This prevents excessive tightening of the bolts 81 and ensures smooth sliding of the lower cutter 61 and upper cutter 62.

The elongated holes 611 and the elongated holes 621 are exposed to the outside of the cutter assembly 6. In this case, during pruning of hedges or trees, a tip of a branch may enter an elongated hole 611 and an elongated hole 621. In this state, when the cutter assembly 6 swings in the left-right direction (work direction in FIG. 1 and FIG. 4), the tip of the branch gets caught by the circumferential edges of the elongated hole 611 of the lower cutter 61 and the elongated hole 621 of the upper cutter 62, which causes resistance to a swing operation and reduces workability.

According to the present invention, an area along the longitudinal direction on the inner circumferential face of each of the elongated holes 611 and 621 has at least one first removal structure having a function of contacting a branch having entered the elongated hole 611 or 621 and removing it from within the elongated hole 611 or 621. This makes it possible to hinder the tip of the entering branch from staying at the circumference edges of the elongated holes 611 and 621 of the lower cutter 61 and the upper cutter 62, and also makes it possible to remove the tip of the entering branch more quickly than in the cutter assembly 6 without the first protrusions, which prevents resistance to the swing operation with the hedge trimmer 1 from occurring and thereby impairing workability.

The removal structure according to the present embodiment is formed by first protrusions PI1 and PI2 protruding into the elongated holes 611 and 621. Such first protrusions PI1 and PI2 can, with simple configurations, reliably contact a branch that has entered the elongated holes 611 and 621 and therefore reliably function as a branch removal structure. Hereinafter, when the first protrusions PI1 and PI2 do not need to be distinguished, they are referred to as "first protrusions PI".

With reference to FIG. 5 to FIG. 7, a description will be given of a mechanism that branches get caught by the elongated holes 611 and 621 and a mechanism that may remove the branches.

First, as illustrated in FIG. 5, in a case where the longitudinal lengths of the elongated holes 611 and 621 are less than the maximum relative movement distance of the lower cutter 61 and upper cutter 62, the end faces of the elongated holes 611 and 621 contact a branch having entered the elongated holes 611 and 621 and then push out and remove the branch from the elongated holes 611 and 621.

In contrast, as illustrated in FIG. 6, in a case where the longitudinal lengths of the elongated holes 611 and 621 exceeds the maximum relative movement distance of the lower cutter 61 and the upper cutter 62, the end faces of the elongated holes 611 and 621 do not contact the branch having entered the elongated holes 611 and 621, and therefore the branch stays in the area represented by the shaded lines in FIG. 6. In this state, when the hedge trimmer 1 swings left and right, the tip of the branch gets caught by the circumferential edges of the elongated holes 611 and 621 of the lower cutter 61 and upper cutter 62, which causes resistance to the swing operation and lowers workability.

Thus, when the longitudinal length of the elongated holes 611 and 621 exceeds the maximum relative movement distance of the lower cutter 61 and the upper cutter 62, providing the first protrusions PI protruding into the elongated holes 611 and 621 can allow a branch having entered the elongated holes 611 and 621 to contact the end faces or the first protrusions PI of the elongated holes 611 and 621 and thereby to be removed (pushed out) from the elongated holes 611 and 621. In other words, when the longitudinal length of the elongated holes 611 and 621 exceeds the maximum relative movement distance between the lower cutter 61 and the upper cutter 62, the first protrusions PI protruding into the elongated holes 611 and 621 may be provided.

As illustrated in FIG. 4, a first protrusion PI1 is disposed in an area opposite to a cutting edge B1 (in an area on the same side as a cutting edge B2) on the inner circumferential face of each of the elongated holes 611 and 621 so that the protruding direction of the first protrusion PI1 is substantially parallel to the protruding direction of the cutting edge B1, and a first protrusion PI2 is disposed in an area opposite to the cutting edge B2 (in an area on the same side as the cutting edge B1) on the inner circumferential face of each of the elongated holes 611 and 621 so that the protruding direction of the first protrusion PI2 is substantially parallel to the protruding direction of the cutting edge B2. Such an arrangement of the first protrusions PI facilitates smoother and securer removal of a branch having entered the elongated holes 611 and 621.

Each first protrusion PI has a shape in a plan view of the cutter assembly 6 (plan view shape) of a triangle. Since the plan view shape of each first protrusion PI is a triangle, it is easier to move a branch along slope faces of the first protrusion PI, and it is not likely to cause a feeling of the tip of the branch getting caught.

Each triangle may have an obtuse angle ($\theta$ in FIG. 4) at its apex. In this case, it is easier to move branches along the slope faces of the first protrusions PI and more effective in removing the branches from the elongated holes 611 and 621.

As illustrated in FIG. 7, in each of the elongated holes 611 and 621, the maximum length PL along the longitudinal direction between the inner circumferential face (end face in the longitudinal direction) and the apex of the triangle may be equal to or less than the maximum relative movement distance D between the lower cutter 61 and the upper cutter 62. This allows the first protrusion PI to more reliably contact the branch having entered the elongated holes 611 and 621.

As described above, the lower cutter support 63 is divided into two parts, the front support 63a and the rear support 63b, for the weight reduction of the cutter assembly 6. Thus, the lower cutter 61 and the upper cutter 62 have areas not covered by the lower cutter support 63. In such areas, branches can more easily enter the elongated holes 611 and 621, and therefore it is particularly effective to provide a first protrusion PI (removal structure). In other words, the first protrusions PI (removal structure) may be provided in the elongated holes 611 and 621 disposed in the area not covered by the lower cutter support 63.

As illustrated in FIG. 4, each cutting edge B (B1 and B2) has a plan view shape of a trapezoid with a high height. The boundary of each cutting edge B with the cutter main body M has a rounded shape. With such a configuration, when the lower cutter 61 and the upper cutter 62 slide back and forth and their cutting edges B hold a pruning (cutting) object (such as a branch) therebetween, the pruning object can be easily pushed out and removed to the lateral sides of the cutter assembly 6 while being cut.

The cutter main body M has at least one second removal structure between each pair of adjacent cutting edges B (B1 and B2), the at least one second removal structure having a function of contacting a branch and thereby removing it from between the cutting edges B (B1 and B2). This facilitates smoother removal of pruning objects toward the left and right directions of the cutter assembly 6.

The second removal structure according to the present embodiment is formed by second protrusions PO1 protruding in the same direction as the protruding direction of the cutting edge B1 or second protrusions PO2 protruding in the same direction as the protruding direction of the cutting edge B2. Such second protrusions PO1 and PO2 can reliably exhibit the function as a branch removal structure. Hereinafter, when the second protrusions PO1 and PO2 do not need to be distinguished, they are referred to as "second protrusions PO".

Each second protrusion PO1 is disposed so that its protruding direction is substantially parallel to the protruding direction of the cutting edge B1, and each second protrusion PO2 is disposed so that its protruding direction is substantially parallel to the protruding direction of the cutting edge B2. Such an arrangement of the second protrusions PO1 and PO2 facilitates smoother and securer removal of the pruning objects present between the adjacent cutting edges B (B1 and B2) toward the left and right directions of the cutter assembly 6.

The plan view shape, configuration, etc. of the second protrusions PO may differ from the plan view shape, configuration, etc. of the first protrusions PI, but in this embodiment, they are designed to be substantially the same.

In the above-described cutter assembly 6, each of the elongated holes 611 and 621 may have a plurality of first protrusions PI1 and PI2 in an area along the longitudinal direction on the inner circumferential face, depending on the length of the elongated hole 611 or 621. A plurality of second protrusions PO1 and PO2 may be disposed along the longitudinal direction of the cutter main body M depending on the distance between adjacent cutting edges B1 and B2. In these cases, it may be considered that an area between the adjacent first protrusions PI1 or PI2 and an area between the adjacent second protrusions PO1 or PO2 form a recess or a groove, respectively. In other words, the first removal structure and the second removal structure may be configured as a recess or a groove, respectively.

The first removal structure (first protrusions PI1 and PI2) and the second removal structure (second protrusions PO1 and PO2) are provided on both the lower cutter 61 and the upper cutter 62, but they may be provided only on the lower cutter 61. In this case, the same actions and effects can be exhibited as described above. That is, the first removal structure (first protrusions PI1 and PI2) and the second removal structure (second protrusions PO1 and PO2) may be provided at least on the lower cutter 61.

Second Embodiment

Next, a description will be given of a cutter assembly and a hedge trimmer according to the second embodiment of the present invention.

Hereinafter, as for the second embodiment, a description will be mainly given of differences from the above-described first embodiment, and omitted of similar matters.

The cutter assembly 6 according to the second embodiment is similar to the above-described cutter assembly 6 according to the first embodiment, except that the cutter assembly 6 according to the second embodiment has a single-edged configuration.

Figure 8:
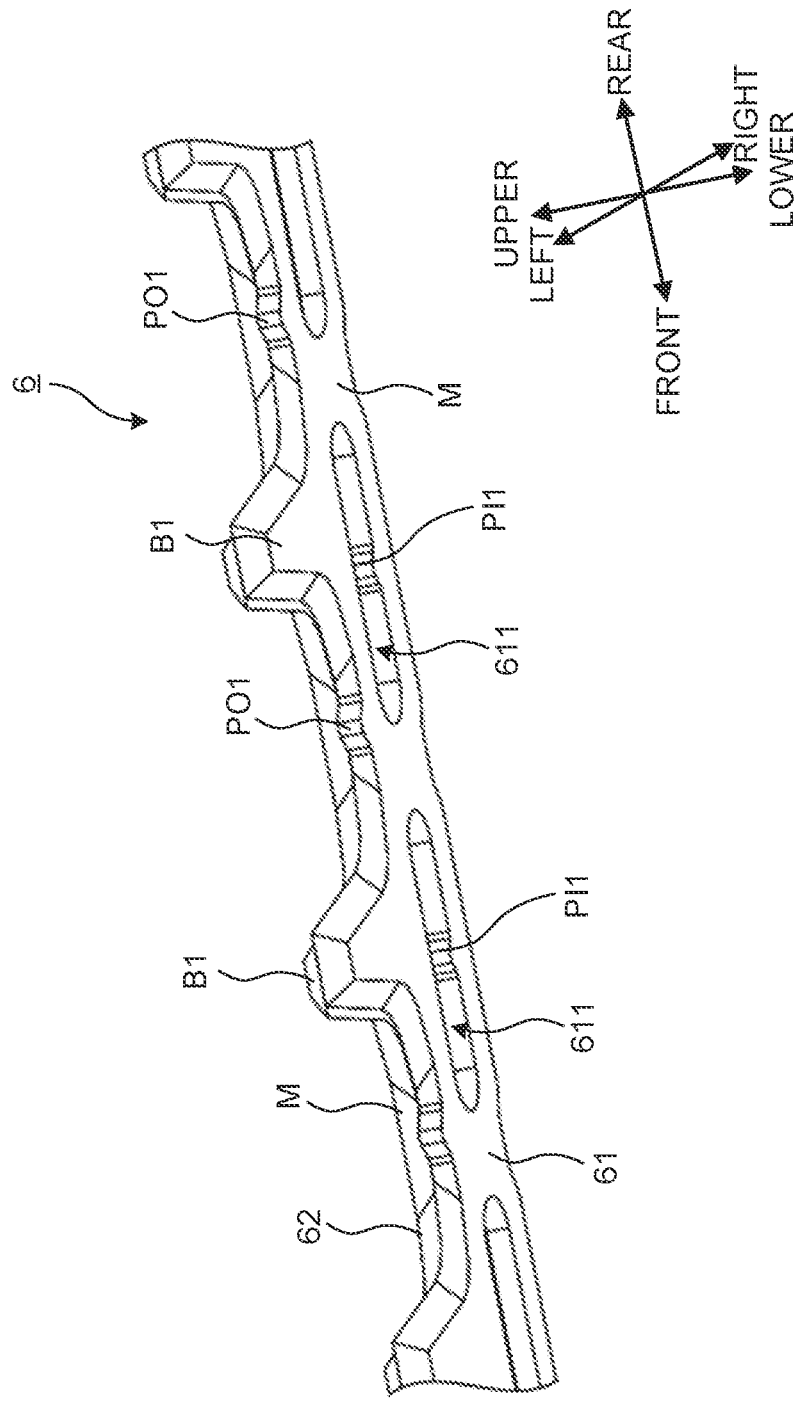
FIG. 8 is an enlarged lower perspective view of part of a cutter assembly according to the second embodiment.

FIG. 8 is an enlarged lower perspective view of part of the cutter assembly according to the second embodiment.

As illustrated in FIG. 8, in the cutter assembly 6 according to the second embodiment, a plurality of cutting edges B1 of each of the lower cutter 61 and the upper cutter 62 protrudes to only one side of the cutter main body M.

The single-edged cutter assembly 6 has the first removal structure and the second removal structure only on the lower cutter 61.

Specifically, the first removal structure is formed by first protrusions PI1 protruding into the elongated holes 611, and in each elongated hole 611, the first protrusion PI1 is disposed in an area opposite to the cutting edge B1 on the inner circumferential face so that the protruding direction of the first protrusion PI1 is substantially parallel to the protruding direction of the cutting edge B1.

The second removal structure is formed by second protrusions PO1 protruding in the same direction as the protruding direction of the cutting edges B1.

The cutter assembly 6 and the hedge trimmer 1 according to the second embodiment also exhibit the similar actions and effects to the actions and effects of the above-described cutter assembly 6 and hedge trimmer 1 according to the first embodiment.

Both the lower cutter 61 and the upper cutter 62 may have the first removal structure and the second removal structure, as in the above-described first embodiment. In other words, the first removal structure and the second removal structure may be formed at least on the lower cutter 61.

In the above-described cutter assembly 6 and the hedge trimmer 1, an elongated hole formed on the cutter has at least one first removal structure having a function of contacting a branch that has entered the elongated hole and thereby removing the branch from within the elongated hole, hindering the branch from staying in the elongated hole during branch pruning work. Therefore, when the cutter assembly 6 swings in the working direction, it is difficult to cause a feeling of the resistance caused by the branches getting caught, thereby preventing a reduction in workability.

An engine may be used to power the hedge trimmer 1 instead of the electric motor 32.

The first and second removal structures are not limited to configurations with rigid protrusions, respectively, but may also be configured with plate springs (elastically deformable protrusions).

In addition, each of the following aspects may be provided.

(1) A cutter assembly for a hedge trimmer comprising: a lower cutter and an upper cutter overlap each other and slidable along their longitudinal direction, wherein: each of the lower cutter and the upper cutter has: a cutter main body; and a plurality of cutting edges protruding laterally from the cutter main body, at least the cutter main body of the lower cutter has an elongated hole penetrating the cutter main body of the lower cutter in its thickness direction and extending along the longitudinal direction, the elongated hole is exposed to an outside of the cutter assembly, and an area along the longitudinal direction on an inner circumferential face of the elongated hole has at least one removal structure having a function of contacting a branch that has entered the elongated hole, and thereby removing the branch from within the elongated hole.

(2) The cutter assembly according to (1), wherein: a length along the longitudinal direction of the elongated hole exceeds a maximum relative movement distance between the lower cutter and the upper cutter.

(3) The cutter assembly according to (1) or (2), wherein: the removal structure is formed by a protrusion protruding into the elongated hole.

(4) The cutter assembly according to (3), wherein: the protrusion is disposed in an area on a side of the inner circumferential face of the elongated hole, the side being opposite to the cutting edges, a protruding direction of the protrusion being substantially parallel to a protruding direction of the cutting edges.

(5) The cutter assembly according to (3) or (4), wherein: the protrusion has a shape of a triangle in a plan view of the cutter assembly.

(6) The cutter assembly according to (5), wherein: the triangle has an obtuse angle at its apex.

(7) The cutter assembly according to (5) or (6), wherein: a maximum length along the longitudinal direction between the inner circumferential face of the elongated hole and an apex of the triangle is equal to or less than a maximum relative movement distance between the lower cutter and the upper cutter.

(8) The cutter assembly according to any one of (1) to (7), wherein: at least the cutter main body of the lower cutter has at least one second removal structure between a pair of adjacent cutting edges of the cutting edges, the at least one second removal structure having a function of contacting a branch and thereby removing the branch from between the adjacent cutting edges.

(9) The cutter assembly according to (8), wherein: the second removal structure is formed by a second protrusion protruding in a same direction as a protruding direction of the cutting edges.

(10) The cutter assembly according to (9), wherein: a protruding direction of the second protrusion is substantially parallel to the protruding direction of the cutting edges.

(11) The cutter assembly according to any one of (8) to (10), wherein: the cutter assembly has a single-edged configuration with the plurality of cutting edges of each of the lower cutter and the upper cutter protruding to only one side of the cutter main body, and in the single-edged cutter assembly, the removal structure and the second removal structure are disposed at least on the lower cutter.

(12) The cutter assembly according to any one of (8) to (10), wherein: the cutter assembly has a double-edged configuration with the plurality of cutting edges of each of the lower cutter and the upper cutter protruding to both sides of the cutter main body, and in the double-edged cutter assembly, the removal structure and the second removal structure are disposed at least on the lower cutter.

(13) The cutter assembly according to any one of (1) to (12), further comprising a cutter support on a side of the lower cutter, the side being opposite to the upper cutter, the cutter support covering part of the lower cutter, and the removal structure is formed in the elongated hole that is disposed in an area not covered by the cutter support.

(14) A hedge trimmer comprising: the cutter assembly according to any one of (1) to (13); a power source configured to allow the lower cutter and the upper cutter of the cutter assembly to slide relatively to each other along the longitudinal direction.

Of course, the present invention is not limited to those.

Finally, various embodiments of the present invention have been described, but these are presented as examples and are not intended to limit the scope of the invention. Novel embodiments can be implemented in various other forms, and various omissions, replacements, and modifications can be made within the scope of the spirit of the invention. The embodiments and its modifications are included in the scope and the spirit of the invention and are included in the scope of the invention described in claims and the equivalent scope thereof.

What is claimed is:

1. A cutter assembly for a hedge trimmer comprising:
a lower cutter and an upper cutter, each of the lower cutter and the upper cutter being a longitudinal structure and having a longitudinal axis, the lower cutter and the upper cutter overlapping each other along a first direction perpendicular to the longitudinal axis of the lower cutter, the lower cutter and the upper cutter being configured to slide relative to each other along a second direction parallel to the longitudinal axis of the lower cutter, wherein
each of the lower cutter and the upper cutter has:
a cutter main body; and
a plurality of cutting edges protruding from the cutter main body along a third direction perpendicular to the longitudinal axis of each of the lower and upper cutters,
the cutter main body of the lower cutter has an inner circumferential face, and the inner circumferential face encloses an elongated hole,
the elongated hole penetrates the cutter main body of the lower cutter, and the first direction is a penetration direction of the elongated hole and perpendicular to each of the second and third directions,
the elongated hole elongates along the second direction,
the inner circumferential face is configured with first and second sides facing each other and third and fourth sides facing each other, and each of the first and second sides is longer than each of the third and fourth sides,
the elongated hole is exposed to an outside of the cutter assembly, and
the first side of the inner circumferential face has a branch removal protrusion protruding toward the second side of the inner circumferential face.

2. The cutter assembly according to claim 1, wherein
a length along the second direction of the elongated hole exceeds a relative sliding distance between the lower cutter and the upper cutter.

3. The cutter assembly according to claim 1, wherein
the protrusion protrudes substantially parallel to the third direction.

4. The cutter assembly according to claim 1, wherein
the protrusion has a shape of a triangle in a plan view of the cutter assembly.

5. The cutter assembly according to claim 4, wherein
the triangle has an obtuse angle at its at an apex of the triangle.

6. The cutter assembly according to claim 4, wherein
a distance, along the second direction, between the third side of the inner circumferential face of the elongated hole and the apex of the triangle is equal to or less than a relative sliding distance between the lower cutter and the upper cutter.

7. The cutter assembly according to claim 1, wherein
another protrusion protrudes from a first position of an outer circumference face of the cutter main body of the lower cutter along the third direction, and the first position is located between two adjacent cutting edges of the plurality of cutting edges.

8. The cutter assembly according to claim 1, wherein
the cutter assembly has a single-edged configuration with the plurality of cutting edges of each of the lower cutter and the upper cutter protruding to only one side of the cutter main body.

9. The cutter assembly according to claim 1, wherein
the cutter assembly has a double-edged configuration with
the plurality of cutting edges of each of the lower cutter
and the upper cutter protruding to both sides of the
cutter main body.

10. The cutter assembly according to claim 1, further
comprising a cutter support on a lower side of the lower
cutter, the lower side facing away from the upper cutter, the
cutter support covering part of the lower cutter, and
the protrusion is disposed in an area, which is not covered
by the cutter support, of the cutter main body of the
lower cutter.

11. A hedge trimmer comprising:
the cutter assembly according to claim 1;
a power source configured to cause the lower cutter and
the upper cutter of the cutter assembly to slide rela-
tively to each other along the second direction.

\* \* \* \* \*